(12) United States Patent
Karpoff et al.

(10) Patent No.: US 6,857,059 B2
(45) Date of Patent: Feb. 15, 2005

(54) STORAGE VIRTUALIZATION SYSTEM AND METHODS

(75) Inventors: Wayne Karpoff, Sherwood Park (CA); Brian Lake, Edmonton (CA)

(73) Assignee: YottaYotta, Inc., Edmonton (CA)

( * ) Notice: Subject to any disclaimer, the term of this patent is extended or adjusted under 35 U.S.C. 154(b) by 201 days.

(21) Appl. No.: 10/046,070

(22) Filed: Jan. 11, 2002

(65) Prior Publication Data

US 2002/0112113 A1 Aug. 15, 2002

Related U.S. Application Data

(60) Provisional application No. 60/261,140, filed on Jan. 11, 2001.

(51) Int. Cl.$^7$ .............................................. G06F 12/00
(52) U.S. Cl. ........................ 711/209; 711/114; 711/170; 711/200
(58) Field of Search ................................ 711/209, 200, 711/114, 170, 203

(56) References Cited

U.S. PATENT DOCUMENTS

| | | | |
|---|---|---|---|
| 4,080,652 A | | 3/1978 | Cronshaw et al. |
| 5,155,835 A | | 10/1992 | Belsan |
| 5,193,184 A | | 3/1993 | Belsan et al. |
| 5,301,297 A | | 4/1994 | Menon et al. |
| 5,448,709 A | | 9/1995 | Chandler et al. |
| 5,657,468 A | | 8/1997 | Stallmo et al. |
| 5,875,456 A | | 2/1999 | Stallmo et al. |
| 6,052,759 A | | 4/2000 | Stallmo et al. |
| 6,148,414 A | | 11/2000 | Brown et al. |
| 6,233,648 B1 | * | 5/2001 | Tomita ............................ 711/4 |
| 2001/0049740 A1 | | 12/2001 | Karpoff |
| 2002/0026558 A1 | | 2/2002 | Reuter et al. |

FOREIGN PATENT DOCUMENTS

WO   WO 02/08899 A2   1/2002
WO   WO 02/13033 A1   2/2002

OTHER PUBLICATIONS

"Storage Virtualization", Storage Virtualization Brief, *VERITAS Software Corporation*, pp. 1–19 (Apr. 2001).

"VERITAS SANPoint Foundation Sutie HA Sharing Data in Storage Area Networks," *VERITAS Software Corporation*, pp. 1–8 (Jan. 2001).

Sosinsky, B., "The Business Value of Virtual Volume Management", *VERITAS Software Corporation*, pp. 1–12 (Oct. 2001).

Winett, B., Silicon Storage Applicances *Implementation Advantage, DataDirect Networks, Inc.*, pp. 1–13 (Jun. 2001, Rev. Nov. 30, 2001).

Woolery, R., "DataDirect Networks' Silicon Storage Appliance Enabling Storage Networks," *DataDirect Netorsk,Inc.*, pp. 1–11 (2000, Rev. 2001).

* cited by examiner

*Primary Examiner*—Reba I. Elmore
(74) *Attorney, Agent, or Firm*—Townsend and Townsend and Crew LLP; Gerald T. Gray

(57) ABSTRACT

Storage virtualization systems and methods that allow customers to manage storage as a utility rather than as islands of storage which are independent of each other. A demand mapped virtual disk image of up to an arbitrarily large size is presented to a host system. The virtualization system allocates physical storage from a storage pool dynamically in response to host I/O requests, e.g., SCSI I/O requests, allowing for the amortization of storage resources through a disk subsystem while maintaining coherency amongst I/O RAID traffic. In one embodiment, the virtualization functionality is implemented in a controller device, such as a controller card residing in a switch device or other network device, coupled to a storage system on a storage area network (SAN). The resulting virtual disk image that is observed by the host computer is larger than the amount of physical storage actually consumed.

16 Claims, 5 Drawing Sheets

Figure 3: Software Stack

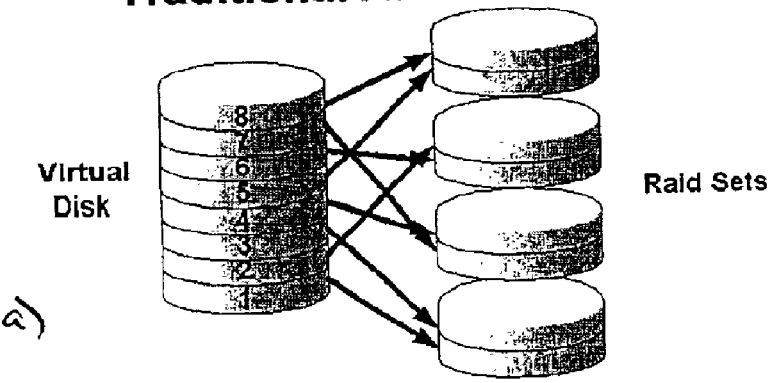
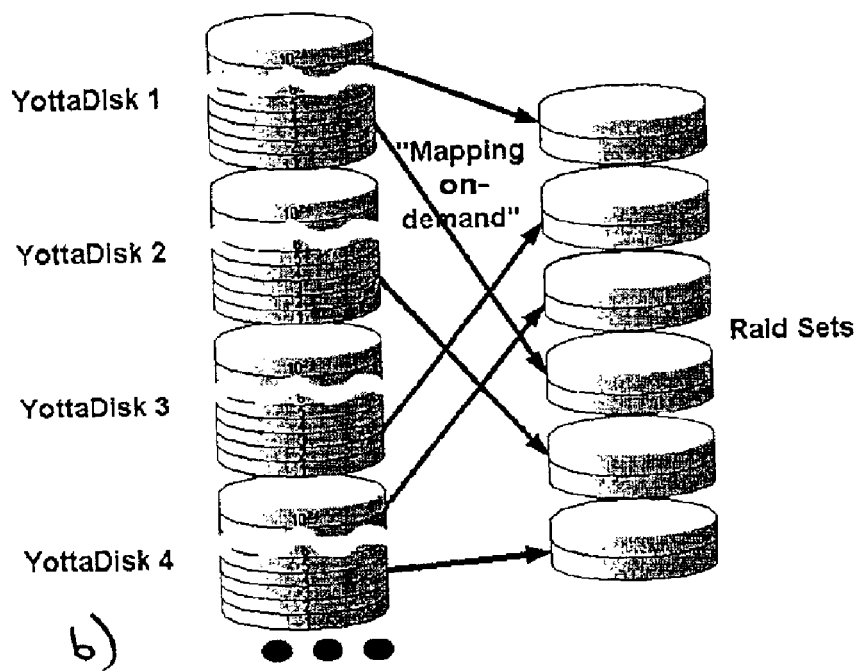
Figure 5

STORAGE VIRTUALIZATION SYSTEM AND METHODS

CROSS-REFERENCES TO RELATED APPLICATIONS

This application claims the benefit of U.S. patent application Ser. No. 60/261,140, filed Jan. 11, 2001, entitled, "Storage Virtualization System & Methods," the disclosure of which is hereby incorporated by reference in its entirety.

BACKGROUND OF THE INVENTION

The present invention relates generally to systems and methods for implementating storage virtualization in a data storage network, and more specifically to systems and methods of utilizing multiple storage devices in a network and managing the storage devices as a single entity enabling storage to be utilized as a utility.

The role of data is changing. Its true value to a business and a computer system is being recognized. This change is driving the return of storage architecture to a data center model. In this model, disk storage is the nucleus of the computing system and is thereby centrally located in a controlled environment. This approach significantly lowers the costs associated with data management.

Storage virtualization has recently received considerable attention in the industry. It offers the ability to isolate a host from changes in the physical placement of storage. The result is a substantial reduction in support effort and end-user impact.

Traditionally, a Storage Virtualization Layer (SVL) referred to a level of abstraction implemented in software that servers use to divide available physical storage into virtual disks or volumes. Virtual volumes are used by the Operating System (OS) as if they were physical disks. In fact, it is generally impossible for an operating system to perceive them as anything but real disks. The Storage Virtualization Layer redirects or maps I/O requests made against a virtual disk to blocks in real storage. This direction/redirection means that changes in the physical location of storage blocks (to service access patterns, performance requirements, growth requirements or failure recovery) can be accommodated by a simple update of the virtual-to-real mappings.

A virtual volume can be created, expanded, deleted, moved and selectively presented independent of the storage subsystems on which it resides. Furthermore, a virtual volume may include storage space in different storage subsystems, each with different characteristics. Virtualization architectures will play a key role in solving centralization problems, enabling important functions such as storage sharing, data sharing, performance optimization, storage on demand, and data protection.

Current Approaches to Virtualization

Currently, storage providers and storage solution providers use a one-to-one method of virtualization where each virtual block of data is mapped to a single physical block of data. An example of such a traditional architecture is shown in FIG. 5a.

Whenever an I/O operation to a virtual disk is requested, a translation from a virtual disk address (virtual disk+block) to a physical disk address (device set+block) occurs via an in-stream mechanism.

Virtualization allows reorganization of the physical storage underlying the virtual disks to occur in a non-disruptive fashion at any time. New physical disks can be added to the system, the virtual disk can grow, or the mapping from virtual to physical disks can change, at the discretion of the administrator, invisibly to the user. The one inviolate requirement is that every single virtual block is mapped onto the physical disk set.

There are generally three (3) main virtualization implementation methodologies currently employed in the storage industry: Host-Based, Storage-Based, and Network-Based.

The Host-Based approach relies on an agent, or management software installed on one or more host systems, to implement the control and administrative functionality of storage virtualization. The Storage-Based approach to virtualization relies on the storage subsystem to provide the functionality, while the Network-Based approach implements the storage virtualization functionality within equipment on the network (e.g., appliances, switches, routers). From an access control perspective, the Network-Based approach provides the greatest degree of access control to the client-server computers since conceivably all of the servers on the network have access to the same virtual storage functionality.

Storage Service Providers (SSPs) are developing large customer bases, potentially in the millions, so manageability, maintenance, and cost are major concerns. SSPs also have to provide for the data expansion requirements of their customers. Because it takes time to acquire, physically configure and/or re-partition disks, and to copy data to the new disks when storage needs change, expanding customer storage needs are often expensive and labor intensive. Additionally, customer separation, which ensures customer data remains secure and completely separate from the data of other storage customers, adds to the maintenance burden. With traditional "separation" mechanisms such as Logical Unit Number (LUN) masking, physical isolation, and separation of management, "customer separation" can quickly become unwieldy and impractical—creating a maintenance and support nightmare.

The foregoing has pushed the storage industry towards a new approach to virtualization, which allows for storage to be managed as a utility rather than as islands of storage that require individual care, but which is still synergistic with traditional approaches to virtualization.

BRIEF SUMMARY OF THE INVENTION

The present invention provides storage virtualization systems and methods that allow customers to manage storage as a utility rather than as islands of storage which are independent of each other. The systems and methods of the present invention implement a novel type of virtualization of a storage network that is useful for serving the needs of the xSP markets.

According to the present invention, a demand mapped virtual disk image of up to an arbitrarily large size (for example, $10^{24}$ bytes) is presented to a host, e.g., the end-customer. In one embodiment, for example, the virtual disk image is used to produce a mapping from the virtual disk image to back-end physical storage which is done dynamically as a result of an I/O operation, e.g., write operation, performed on the physical storage. Remapping the storage allows the back-end storage to be managed without consumer impact and multiple back-end partitions to be combined to provide a single virtual image. The disk image of the present invention presents potentially a very large image to the consumer to isolate him from volume resizing issues and to allow easy consumption. This image may be supported by a management system that provides the ability to control consumption and growth rates as well as maintain core system processes such as creating, deleting and mounting other candidate disks.

According to the present invention, the demand mapped disk image presented includes some or all of the following features:

(i) Virtual—The disk image presented to the end-consumer is remapped to the back-end physical pool (like traditional "virtual disks" provided by companies such as Veritas and DataCore). This allows back-end storage to be managed without consumer impact and multiple back-end partitions to be combined to provide a single virtual image.

(ii) Dynamically mapped—Unlike current virtual disks, the mapping from virtual disk image to back-end storage is done dynamically as a result of a write operation. This allows a 'utility model' to be presented where the back-end storage is a pooled resource. This is important because the cost of reserved capacity can be pooled across multiple consumer groups and the back-end storage can be administered as a pool. Both offer major cost savings. Additionally, it enables an "easy consumption" model, which is significantly more revenue conducive than current models.

(iii) Potentially very large, a very large image may be presented to the consumer to isolate the user from volume resizing issues and to allow easy consumption. In one embodiment, 80 bit addressing ($2^{80}$ is 1.2 Yotta) is used. However, given that block devices are being addressed that would provide (at least) $2^{89}$ bytes or 618 Yottabytes. This is discussed more in the implementation notes below. Disk images of more arbitrary size may be created. A traditional file system, for example, could only handle a disk image with $2^{32}$ blocks.

(iv) Supported by a management system—the ability to create, delete and mount virtual disks, and to track consumption, limit growth rates (what happens if a virus starts writing to disk), and provide accounting interfaces.

Like "regular" virtual disks, the present invention can also be used with RAID sets; however, a major difference exists between "regular" virtual disk architecture and the architecture of the present invention. According to the present invention, there is no pre-defined mapping to real disks when the disk image is assigned to the customer. Instead, the disk image is "empty". A mapping to a real disk is preferably only created when a particular disk block on the disk image is referenced. When a disk block becomes unused, the physical block is freed and returned to the pool of free blocks.

The present invention offers many advantages over prior systems. First, host applications never have to deal with volume resizing. Second, spare capacity (or "slack space") can be amortized across multiple disk images, thus lowering the cost associated with "on reserve" storage capacity. Third, the management and policy administration associated with storage resource allocation can be automated thus reducing costs and providing the opportunity for new business models based on true utility-style operations. Fourth, because the overhead is reduced to storage actually in use, it is now practical to create large numbers of virtual volumes allowing the separation of a customer or department population. Fifth, in a distributed implementation, data can always be written with "local" performance, even though other parts of the disk image are housed at remote locations. Further, the present invention provides an on-demand revenue model opportunity for SSPs, Application Service Providers (ASPs), Network Service Providers (NSPs), and Operational Service Providers (OSPs).

Traditionally, restriction of disk growth has been implemented by restricting the size of disk partition available. The present invention provides an easy interface whereby the user, the customer administrator, and (if appropriate) the SSP administrator can throttle disk consumption and impose limits. Charge back, the method whereby an IT department "charges" other internal departments for the use of centrally supported resources, can reflect actual storage usage.

According to an aspect of the present invention, a method is provided for dynamically mapping addresses between a virtual disk address and one or more physical block addresses for a storage system in response to a write operation requested by a host system. The method typically includes receiving a write request from a host, the write request including a virtual memory address and one or more blocks of data, and determining whether memory space in the storage system has been allocated for the one or more blocks of data based on the virtual memory address. If it is determined that memory space has been allocated, the method typically includes completing the write operation to the allocated memory space. If it is determined that no memory space has been allocated, the method typically includes automatically allocating memory space in the storage system for the one or more blocks of data, and completing the write operation to the allocated memory space.

According to another aspect of the present invention, a method is provided for dynamically mapping addresses between a virtual disk address and one or more physical block addresses for a storage system in response to a request from a host system to perform an operation on the storage system. The method typically includes receiving a request from a host to perform an operation on one or more blocks of the storage system, the request including a virtual memory address, and determining from a mapping table whether memory space in the storage system has been allocated for the virtual memory address. If it is determined that memory space has been allocated, the method typically includes completing the operation on the allocated memory space. If it is determined that no memory space has been allocated, the method typically includes automatically allocating memory space in the storage system for the virtual address, and completing the operation on the allocated memory space.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIGS. 5a and 5b illustrate a traditional architecture and a demand-mapped virtual disk architecture according to an embodiment of the present invention, respectively.

DETAILED DESCRIPTION OF THE INVENTION

The present invention provides a virtualization system that allocates physical storage from a storage pool dynamically in response to host I/O requests, e.g., SCSI I/O requests, allowing for the amortization of storage resources through a disk subsystem while maintaining coherency amongst I/O RAID traffic. In one embodiment, the virtualization functionality as described herein is implemented in a controller device, such as a controller card residing in a switch device or other network device, coupled to a storage system on a storage area network (SAN). The resulting virtual disk image that is observed by the host computer is larger than the amount of physical storage actually consumed. Various optimizations are included to ensure satisfactory performance. Another advantage of the virtualization system is the snapshot capability. The virtualization system also allows for storage to be provided and managed as a utility to a large variable customer base.

Figure 1:
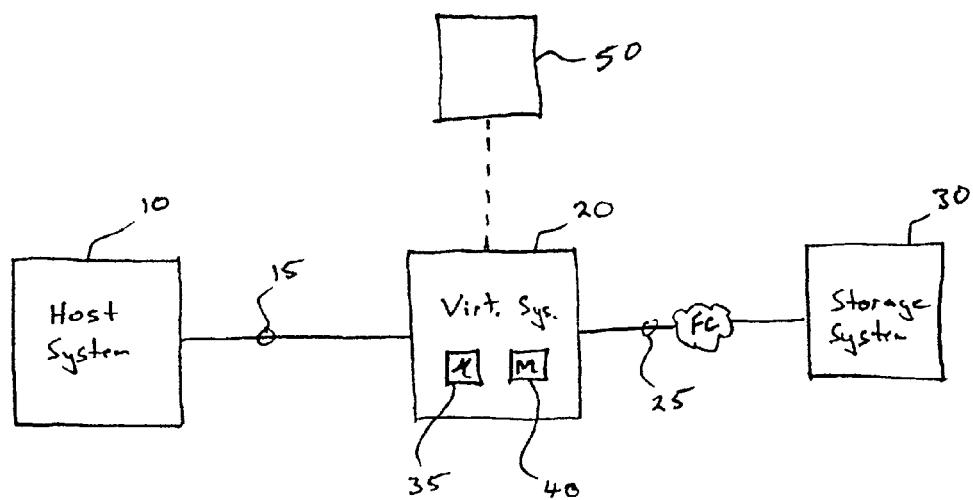
FIG. 1 illustrates an example network architecture including the storage virtualization system of the present invention.

FIG. 1 illustrates an example network architecture including a storage virtualization system of the present invention. As shown, a host system 10, e.g., xSP server, stand-alone PC, etc. is coupled to virtualization module 20 over connection 15. Virtualization module 15 is coupled via network connection 25 to storage system 30. Host 10 may be any type of computer or network device that can be communicably coupled to virtualization system 20 over connection 15. Host system 10 sends various I/O requests to virtualization module 20 over connection 15 to perform various operations on storage system 30. Such I/O requests typically include read and write requests. Connection 15 typically includes a network, but may include a direct connection, e.g., local bus.

In some embodiments, virtualization system 20 is implemented in modules resident, or executing in, one or more controller devices on one or more network switch devices, although the controller device(s) may be implemented in other network devices. One example of such a controller device is a Netstorager™ controller card provided by Yotta Yotta Inc. Aspects of such a controller card are described in U.S. Pat. No. 6,148,414, the contents of which are incorporated by reference herein for all purposes. It should be appreciated, however, that other network devices may implement the functionality of the virtualization system as described herein. Additionally, demand mapping virtualization may also be implemented at the host level in the same way traditional host-level virtualization is done. Such controllers and devices may be configured as described herein and implemented in an edge switch or other switch device, or it may be implemented as a stand-alone device or as one of a plurality of such controllers in, for example, a chassis (e.g., carrier class configuration), and coupled to a switch device. In one HBA implementation, the virtualization system 20 is implemented in a module on a controller card coupled to host 10 over a local bus, such a PCI or infiniband bus.

Storage system 30 is coupled to virtualization system 20 over a network connection 25, e.g., FC SAN, SCSI, iSCSI, Infiniband or other network connection. Additionally, storage system 30, although represented by a single box, includes one or a plurality of separate disk drives managed as one or a plurality of RAID sets, distributed locally and/or remotely from one another.

As shown in FIG. 1, virtualization module 20 includes a memory module 40 coupled to a microprocessor unit 35 or other intelligence module. Microprocessor unit 35 provides overall control and management of the processes and components of virtualization module 20. For example, microprocessor unit 35 executes the demand mapping operations of the present invention in conjunction with mapping data structures stored in memory module 40. The demand mapping operations and other operations as described herein are preferably performed by software executed using microprocessor unit 35 in each of the one or more modules 20 participating in the particular operation. In one embodiment, hardware is used to assist in expediting the mapping functions and other operations of the virtualization system of the present invention. Management system 50 is optionally provided to assist with overall system management and monitoring. Management system 50 preferably includes a server, and preferably communicates with virtualization modules 20 "out-of-band", for example using an Ethernet connection.

The resulting virtual disk image that is observed by the host computer, or presented to the host computer by the virtualization system of the present invention will hereinafter be referred to interchangeably as "virtual disk" or "disk image".

I. Dynamic Mapping—"knowing when and how to do block allocation"

Traditional virtualization systems also present a 'virtual volume' to a host computer. In traditional systems, a storage administrator allocates via a storage management system, which is physical storage represented in the virtual volume. As a result, every block of storage in the virtual volume has assigned physical storage even if the virtual blocks are not currently being used. Adding additional storage to the virtual volume involves operator intervention and causes the virtual volume to grow in a manner visible to host based applications. As a result prior host based applications must address "Volume Resizing" as part of their functionality.

The traditional storage virtualization systems model is not consistent with sharing storage as a utility because of the following factors:

(i) Manual storage administration is inconsistent with maintaining a large consumer base.

(ii) The overhead costs associated with spare capacity cannot easily be amortized across consumers.

(iii) The high cost of creating additional virtual volumes makes a fine granularity of customer or application separation impractical.

(iv) The static approach to allocation prevents the implementation of the ease of consumption business models (i.e. all you have to do is use it without additional phone calls).

(v) Traditional virtualization engines are implemented within the hosts or within the Fibre channel network fabric preventing the implementation of auditable security that is required for hosting multiple mutually un-trusted consumers within a common storage pool.

(vi) The non-parallel implementation of traditional storage systems prevents the performance scalability, fault tolerance, and high availability required to implement utility models.

For storage to be shared as a utility many users with many different applications will require access to the entire storage pool.

In describing the various embodiments of the present invention, a discussion of the following terms will be useful:

Virtual Block: this refers to a SCSI block of data described in terms of a virtual disk image and virtual SCSI block number, as would be seen by the host, prior to translation.

Physical Block: this refers to SCSI block of data described in terms of a physical RAID set identifier and a physical SCSI block number as would be seen used in accessing the RAID engine. While a Physical Block will be broken up and translated, yet again, by the RAID engine, for the purposes of this patent, it can be thought of as the disk resident image and address of data.

Default Formatted Block: This emulates the effect of formatting a disk to a pre-use, well defined value without actually storing any data. It is used in response to read requests for blocks that have not yet been initialized by a write operation. For example, many operating systems write to all blocks on a disk, as a result of the format process done before a new disk is used, typically blocks filled with zeros are used. In embodiments of the present invention, a different Default Formatted Block may be presented for each disk image. The data values for a Default Formatted Block is stored as a simple compressed structure with the format <pattern length> <pattern>. This is, intern, stored as part of the MetaData associated with the disk image as described below.

Allocation Chuck Size: According to one embodiment, the allocation process associated with the disk images described below is forced to allocate a region of continuous blocks instead of allocating blocks one at a time. The size of the Chunk (i.e. the number of blocks allocated in one group) is a variable that can be dynamically set and is stored with the MetaData of the disk image as described below. In one embodiment, chunks are aligned; that is, if block N requires allocation, then blocks "Integer(N/<Allocation Chunk Size>) times <Allocation Chunk Size>" through "Integer(N/<Allocation Chunk Size>) times <Allocation Chunk Size> plus <Allocation Chunk Size>−1" will also be allocated.

The Mapping Structure: The data structure that maintains data allowing translation of virtual block addresses to real block addresses. There is one Mapping Structure per disk image. A variety of structures can be used to house the Mapping Structure. For very small disk images, a simple hash table is preferably used. For medium sized disk images, a B-Tree structure is preferably used. For larger disk images, a hybrid of a structure resembling a Page Tree used in virtual memory management by operating systems is preferably used at the top level to allow for a large amount of sparseness with other structures at the lower levels. The entries of the table typically include three fields:

<flags> <device specifier> <block number>

True/False flags according to one embodiment include:

Allocated—True if Block has been allocated.

Initialized—True if Block was initialized with a write operation. False if not allocated or allocated as a result of a Chunk Size Allocation but not written to (important for insuring that reads of un-initialized data return Default Format Block rather than old data).

Snapshot Block—True if multiple disk images created from a SnapShot Copy operation cause more than one disk image to point to the same block. This allows the knowledge that the block must be copied on write operations.

In one embodiment, top level structures are provided in the Mapping Structure that associate disk images, via trees of linked lists of disk image identifiers, with disk images that contain pointers to the same blocks because of snapshot copy operations. The link list tree reflects the genealogy of disk images created from SnapShot operations and still contain common physical blocks of storage. This structure is called the Snap Shot Genealogy. The management of Snapshot blocks is described below.

According to one embodiment of the present invention, demand mapping is performed by the virtualization module for various storage operations in response to operation requests received from host systems and other network nodes. FIG. 5b illustrates a "mapping-on-demand" architecture according to the present invention, wherein "YottaDisk [™]" refers to a virtual disk image according to the present invention. Examples of demand mapping according to the present invention will now be described for write and read operation requests from a host system.

For the case of a host initiated WRITE operation:

The host sends a write operation request, including data block(s) to be written, that is received by the virtualization system, which then determines, by querying its Mapping Structure (i.e. checking the flag settings for that block number in the Mapping Structure), if storage has been allocated for this block. If storage has been allocated, the block and device address for the block is translated from virtual to real and the operation proceeds by extracting the appropriate <device identifier> <block number> pairs from the Mapping Structure. If the Initialized flag for this virtual block number is False, then it is set to True.

If no storage has been allocated (Allocated flag is False), then the block is compared against the Default Formatted Block. If it matches, the write operation completes successfully with no further action; i.e., the host was attempting to write a block that exactly matched the Default Formatted Block. By doing nothing, any subsequent writes would return Default Formatted Block with no further effort.

If the Block does not match the Default-Formatted Block, the Allocation Chunk Size is consulted to determine how many blocks of storage should be allocated. A pointer from the virtual block address to the newly allocated real block and device address is made in the mapping data structures. The Allocated flags for all newly allocated blocks is set, however, the Initialized flag is set only for the block actually written to. This is repeated for the additional blocks dictated by the Allocation Chunk Size.

The I/O operation then proceeds on the real block and device address.

For the case of a host initiated READ operation:

The host sends a read operation request that is received by the virtualization system. The virtualization system determines, by querying its mapping structures, if storage has been initialized for this block, as determined by the Initialized flag for the virtual block entry in the Mapping Structure. If storage has been initialized, the block and device address for the block is translated from virtual to real and the operation proceeds. If the block has not been initialized, the storage system returns a block of the Default Formatted Block with no actual data being retrieved from disk.

II. Tagging Metadata for Disk Images

According to one embodiment, additional information about a disk image is maintained in a repository that is accessible, by access methods internal to the virtualization system, to the storage management system, and to the storage security system. Information is placed into a database that describes the functionality, administration, and nature of the data included in the disk image. Such Data is called "Metadata". Access to the database housing the Metadata is abstracted through an internal API to ensure only the storage virtualization subsystem has access to the Metadata. Examples of Metadata include: security information regarding what host computers are allowed to mount onto a disk image, what authentication methods are to be used, what "Default Formatted Block" is to be used, what Allocation Chunk size is to be used, disk image usage data including the date of last access, and application format (i.e. what application or file system is controlling block access), which is used in freeing operations as discussed below.

III. Coherency Across Controllers

In embodiments where multiple controller devices, e.g., multiple NetStoragers™, implement the virtualization system of the present invention, all controllers have the same view of the disk at any given time. The objective is to be able to serve disk images from multiple controllers, all with physical access to the common back-end physical storage pool, such that 1) the data served is coherent as taught in U.S. Pat. No. 6,148,414, 2) the mapping of the disk image is coherent across multiple controllers, and/or 3) the Metadata for any given disk image is coherent across multiple controllers.

Figure 2:
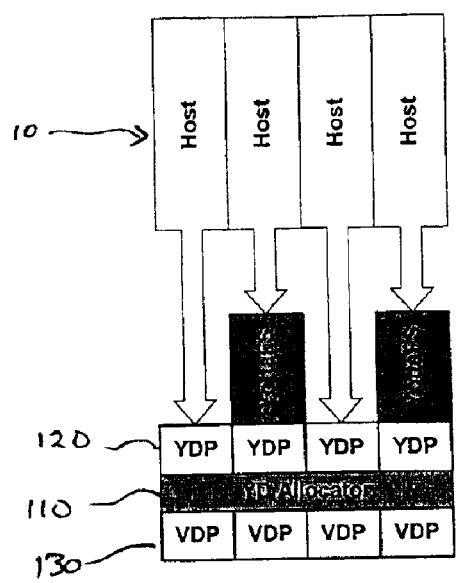
FIG. 2 illustrates an implementation of disk images according to one embodiment that includes a disk image layer in front of the VDP layer.

In the system described in patent U.S. Pat. No. 6,148,414, a software tower implemented on the controller has RAID engines sitting beneath Virtual Disk Ports (VDPs). VDP allow a traditional virtualization view across multiple RAID engines. An implementation of disk images according to one embodiment includes a disk image layer in front of the VDP layer 130 as shown in FIG. 2.

The basic idea is that the virtual disk Allocation Module (YD alloc) 110 provides several demand mapped virtual disk ports (YDPs) 120 an allocation free style interface. The allocation map is preferably kept coherent across all controllers and is persistent on disk.

In one embodiment, the mapping data structures are placed onto a small disk that is not visible to anything other than the virtualization system, that is replicated and made coherent across controllers, for example, using the methods described in U.S. Pat. No. 6,148,414. In one embodiment, the number of controllers that may be involved with synchronization operations is limited based on which controllers are serving hosts that have the virtual disk mounted at any time and based on only synchronizing changes.

In another embodiment, coherence is implemented explicitly at the virtual disk level, for example using the same algorithms used for block coherence in U.S Pat. No. 6,148,414, and completely maintaining the structures of the virtual disk.

IV. Optimizing Free Space

Virtual disks are usually being managed by software on the host. A file system has its own concept of which blocks it thinks it is writing to and which are occupied or free. There is nothing in SCSI that provides an underlying storage subsystem with knowledge of what physical blocks are in use by an application and what blocks are free. While allocating storage can be done in response to write requests as described above, returning blocks to the "free storage pool" for later will now be addressed.

The host based File System's knowledge of what blocks are free must be persistent beyond host memory, allowing for an unexpected failure of the host computer. As a result, some blocks of the storage device under management by the host based file system are used to keep track of what blocks are allocated and what blocks are free. These data structures residing on disk are called the Free Block List. The format of a Free Block List varies from one file system to another. It is also not necessarily completely accurate at any given point in time in that a file system may be in the process of freeing a block when the list is checked. Generally, however, it is conservative in that if, at any moment in time, the Free Block List shows a block as 'free', then it is truly free. If, however, a block is flagged as 'allocated', then it may house data, may be on a reserve list of blocks awaiting allocation or may be in the process of being allocated or freed. This is an important point in determining when it is possible to free virtual disk blocks back into the virtual disk free pool without losing data. In some file systems, particularly some journaling file systems, the effect of a Free Block List is derived from checking several data structures. For the purpose of this invention, this collection of structure checks will still be considered accessing the Free Block List.

According to one embodiment, the virtualization system of the present invention determines that allocated blocks are no longer in use by the host system and returns these blocks to the pool of free blocks available for future allocation as follows:

1) The type of file system is stored in the Metadata for the virtual disk. From this knowledge the location and format of the Free Block List maintained by the host file system is determined.

2) A periodic sweep of the structures is made to look for blocks that are shown as allocated in the Mapping Structures but shown as free in the Free Block List maintained by the host file system. Any legitimately allocated blocks within the contiguous region of blocks determined by the Allocation Chunk Size variable will cause the entire set of blocks to remain allocated.

3) If all blocks within the Allocation Chunk are shown as free in the Free Block List, but not in the mapping structures, then:

i) A lock is applied from within the virtualization system that blocks any I/O operations to the affected blocks.

ii) The comparison in step 3 is reapplied for the range of blocks to ensure there is no change.

iii) Optionally, the freed blocks are cleared to the default format value.

iv) The allocated blocks are placed in the free pool.

v) The mapping structures are updated to indicate the virtual blocks are unallocated.

vi)The lock is removed allowing queued operations to continue.

4) Having Freed a block, related virtual disks, as determined by the Snap Shot Copy Genealogy, are checked to see if only one other virtual disk is pointing to the same block, then the Snap Shot Copy flag is cleared. If, as a result of the free operation, two previously related virtual disks no longer share any common references to physical blocks, then the Genealogy structure is updated to show the virtual disk images as no longer being related.

V. Implementing Storage System Based File Systems.

While the virtual disk of the present invention provides methods whereby a host can access a virtual storage pool via SCSI methods, in some embodiments, parallel file systems are placed directly on the storage virtualization system. Users are able to access the data via various network file system protocols such as NFS or CIFS, via special interfaces that involve placing software on the host computer either at the Virtual File System interface layer or in libraries linked into application software, or via higher level protocols such as FTP, HTTP, RSTP, and Dicom. In one embodiment, the file system is preferably a clustered file system that allows for a consistent file system image when accessed from any of the plurality of controllers. In such a file system, additional interfaces for accessing the virtual disks, other than SCSI commands, are used. In addition to read, and write commands, there are a number of extended functions provided including:

a) explicitly "Free" commands to allow the virtual disk to explicitly free storage to the back-end storage pool;

b) prefetching requests whereby the file system requests the virtualization engine/module and underlying RAID subsystems to begin prefetching specific blocks into cache; and c) commands that allow the underlying storage virtualization system to request what blocks are associated, by virtue of residing in the same file or directory, for management functions being implemented in the underlying subsystem, such as optimization, archival, placement optimization, network prefetching, etc.

Figure 3:
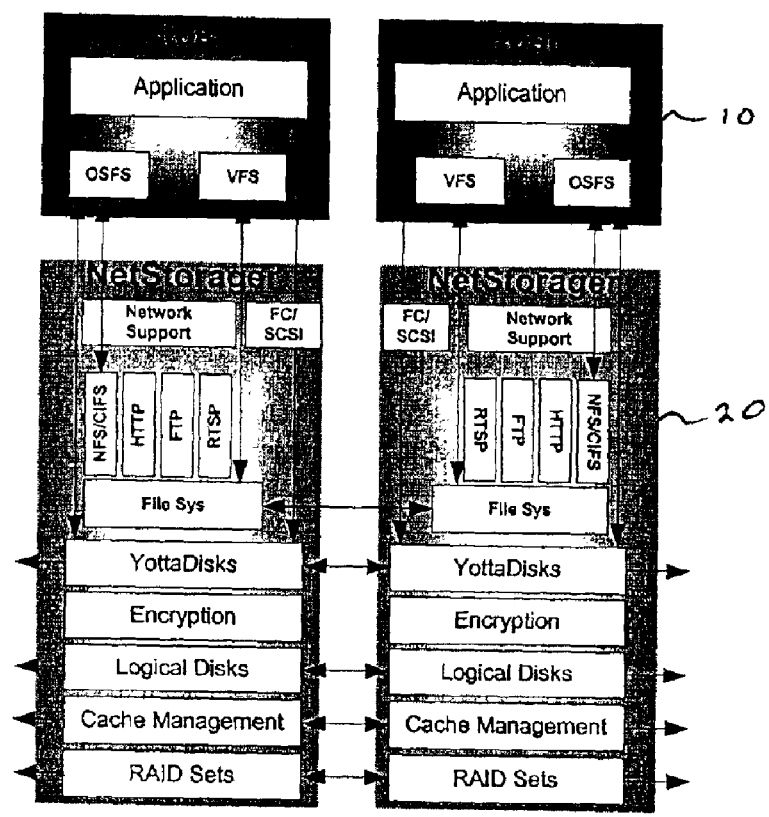
FIG. 3 illustrates a software stack according to one embodiment of the present invention, wherein controller cards implement the virtualization system of the present invention.

FIG. 3 illustrates a software stack according to one embodiment of the present invention, wherein NetStorager™ controller cards implement the virtualization system of the present invention.

VI. Snapshot Copy

A general definition of snapshot copy is: A fully usable copy of a defined virtual disk image, that is looks (from the host perspective) identical to the original virtual disk image at the point when the snapshot copy is created, but will diverge over time. The difference between a snapshot copy and a clone is that clones make complete physical copies of all data. Two or more snapshot copies, on the other hand, share the same physical blocks until writes subsequent to the creation of the snapshot copy cause new blocks to be allocated in order to house the new block image. From the perspective of the host, cloning and snapshot is identical. From the perspective of actual storage consumption, snapshot copies are substantially more efficient from the perspective of storage consumption.

According to one embodiment the snapshot copy of the present invention allows for the creation of a snapshot of the data at any given point in time. The virtualization system of the present invention presents some unique opportunities for implementing Snapshot copy. The basic idea is that a snapshot can be triggered, at any time, on a given virtual disk. During a snapshot copy, a shadow disk image (or virtual copy) is created with all pointers mapping virtual blocks to the same physical blocks used by the original disk image. A user accesses this shadow disk image as a separate LUN. When it is created, the shadow disk image requires no more disk space, other than for the management structures, as it uses the same data blocks as the original disk image. However, when virtual blocks are written to the shadow disk, new physical blocks are allocated that are specific to the shadow disk. The operation is similar to a "copy on write" operation seen in other operating system operations. This allows snapshot copies to be created with minimal storage costs. It also makes it practical for many generations of snapshots to be maintained.

Figure 4:
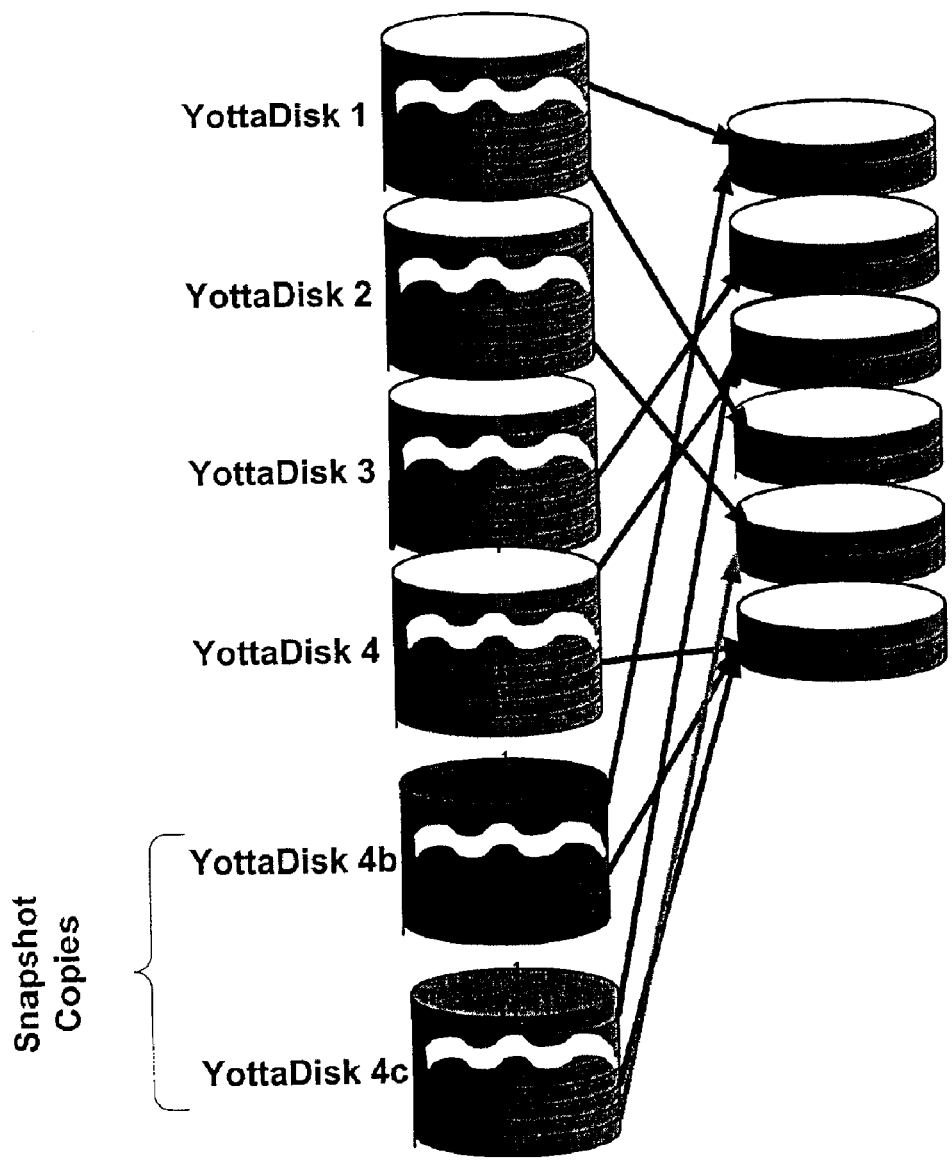
FIG. 4 shows two subsequent snapshots being made from the disk images in FIG. 5b according to an embodiment of the present invention.

FIG. 4 shows two subsequent snapshots (YottaDisk™ 4b and YottaDisk™ 4c) being made from the disk images in FIG. 5b.

According to the present invention, one, two or more logical copies can be created that share the same physical storage until subsequent operations cause individual blocks to be allocated and written to in order to house the differences.

1. At any time, a user can instigate a snapshot copy command for a given virtual disk via the storage management subsystem.

2. At that time a shadow virtual disk is created with all pointers mapping those of the original virtual disk.

In the Mapping Structures for both the virtual disk and corresponding shadow disk, the Snap Shot Block flags are set for any blocks that are allocated. A user accesses this virtual disk as a separate LUN.

For Read Operations:

The block is looked up in the Mapping Structure. Regardless whether the Snap Shot Block flag is set, the read proceeds as described in Section I above.

For Write Operations:

The block is looked up in the Mapping Structure

If the block is unallocated, then the write proceeds as above for an unallocated write as described in Section I above.

If the Snap Shot Copy flag is false, then the write proceeds as above.

If the Snap Shot Copy Flag is true, then new blocks are allocated, observing the chunking rules described above. Any Initialized blocks are copied from the old copy to the new copy. The Allocated and Initialized flag settings are kept for the new blocks. The Device Identifier and Block Number fields are reset to point to the newly allocated storage. The Write operation is allowed to proceed for the targeted at the newly allocated block setting the Initialized variable for that block to True in accordance with the procedures described above.

Using the Snap Shot Geneology, other virtual disks are checked to see if they point to the same blocks and their Snap Shot Copy Flag is set. If there remains only one virtual disk pointing to a given block, then the Snap Shot Copy Flag for that block is cleared. If, as a result, two virtual disk images no longer share any physical blocks, then the Geneology structure is split to indicate the virtual disks are no longer related.

In one implementation, hardware support is used to accelerate the searching required from management of Geneology data and Snap Shot Copy flags.

V Virtual Disk Management System:

The virtualization system of the present invention allows for the following:

The creation and deletion of virtual disks of specified virtual sizes ($2^{32}$, $2^{64}$, $2^{80}$, . . . blocks). This feature may be used either to accommodate specific requirements of host systems (for example special SCSI device drivers are required to address more than $2^{32}$ blocks) or as methods to implement business models whereby limits are placed on the storage consumption by a given end user.

The ability to monitor actual utilization—both at the SSP level (supplier) and at the Enterprise level (consumer).

The ability to 'charge back' based on utilization, wherein a Monitoring system emits usage statistics that can be fed into billing systems.

A method of preventing run-away programs and viruses from consuming disks. If a virtual disk allocated storage at rate that exceeds operator set thresholds, then operator alerts are sounded and/or, if desired, write operations are failed. This prevents computer viruses or runaway programs from consuming all available free storage causing an impact to other users Policies that dictate who is allowed to access virtual disks. Various industry standard authentication systems can be used to authenticate which users are allowed to access which virtual disks. The security information is stored in the virtual disk's Metadata.

The ability to specify what free block format is being used. The usage of this is described in the section on freeing storage above.

The implementation of a storage management system (e.g., system 50 of FIG. 1) is preferably out of band to the virtualization engine/module(s) and communicates via IP protocols. The implementation of graphics, user interfaces, and data base management are intuitive for someone skilled in the art of producing such systems and will not be discussed here.

VII. Revenue Model

Because the virtualization system of the present invention provides 'storage-on-Demand', a number of viable revenue models can be implemented. For example, customers could be offered special replication services according to the activity level of their data. In addition, similar to the way a cell-phone calling plan works, virtual allocation of storage could be sold to customers. Subsequently, premiums could be charged when the customer exceeds the block of storage for which they had initially contracted. With the virtualization system of the present invention, storage can become a true utility like power, water, and the telephone service—it is simply there when you need it. It is easy to consume without vendor interaction. It allows a range of consumption based revenue models.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of dynamically mapping addresses between a virtual disk address and one or more physical block addresses for a storage system in response to a write operation requested by a host system, the method comprising:

receiving a write request from a host, said write request including a virtual memory address and one or more blocks of data;

determining whether memory space in the storage system has been allocated for the one or more blocks of data based on the virtual memory address;

if it is determined that memory space has been allocated, completing the write operation to the allocated memory space; and if it is determined that no memory space has been allocated:

automatically allocating memory space in the storage system for the one or more blocks of data, wherein automatically allocating includes automatically updating a mapping table to include an entry linking the virtual address and one or more physical block addresses of the storage system; and completing the write operation to the allocated memory space.

2. The method of claim 1, wherein determining includes determining whether the mapping table includes a link between the virtual address and one or more physical block addresses of the storage system.

3. The method of claim 1, wherein if it is determined that no memory space has been allocated, the method further comprises:

determining the number of blocks of memory space in the storage system to be allocated.

4. The method of claim 3, wherein the number of blocks allocated is greater than the number of data blocks included with the write request.

5. The method of claim 1, wherein the storage system includes a plurality of storage devices.

6. A method of dynamically mapping addresses between a virtual disk address and one or more physical block addresses for a storage system in response to a request from a host system to perform an operation on the storage system, the method comprising:

receiving a request from a host to perform an operation on one or more blocks of the storage system, said request including a virtual memory address;

determining from a mapping table whether memory space in the storage system has been allocated for the virtual memory address;

if it is determined that memory space has been allocated, completing the operation on the allocated memory space; and if it is determined that no memory space has been allocated:

automatically allocating memory space in the storage system for the virtual address, wherein automatically allocating includes automatically updating a mapping table to include an entry linking the virtual address and one or more physical block addresses of the storage system; and completing the operation on the allocated memory space.

7. The method of claim 6, wherein the operation is a read operation, and wherein if it is determined that memory space has been allocated, completing the operation includes retrieving the data from the allocated memory space.

8. The method of claim 7, wherein the operation is a read operation, and wherein if it determined that no memory space has been allocated, completing the operation includes returning a default formatted page without retrieving any data from the storage system.

9. The method of claim 6, wherein the operation is a write operation and wherein the request includes one or more blocks of data to be written to the storage system.

10. The method of claim 9, wherein if it is determined that no memory space has been allocated, the method further comprises:

determining the number of blocks of memory space in the storage system to be allocated.

11. The method of claim 10, wherein the number of blocks allocated is greater than the number of data blocks included with the write request.

12. The method of claim 6, wherein determining includes determining whether the mapping table includes a link between the virtual address and one or more physical block addresses of the storage system.

13. The method of claim 6, wherein the storage system includes a plurality of storage devices.

14. A method of dynamically mapping addresses between a virtual disk address and one or more physical block addresses for a storage system in response to a write operation requested by a host system, the method comprising:

receiving a write request from a host, said write request including a virtual memory address and one or more blocks of data;

determining whether memory space in the storage system has been allocated for the one or more blocks of data based on the virtual memory address;

if it is determined that memory space has been allocated, completing the write operation to the allocated memory space; and if it is determined that no memory space has been allocated:

automatically allocating memory space in the storage system for the one or more blocks of data, including determining a number of blocks of memory space in the storage system to be allocated, wherein the number of blocks allocated is greater than the number of data blocks included with the write request; and completing the write operation to the allocated memory space.

15. A method of dynamically mapping addresses between a virtual disk address and one or more physical block addresses for a storage system in response to a request from a host system to perform an operation on the storage system, the method comprising:

receiving a request from a host to perform an operation on one or more blocks of the storage system, said request including a virtual memory address;

determining from a mapping table whether memory space in the storage system has been allocated for the virtual memory address;

if it is determined that memory space has been allocated, completing the operation on the allocated memory space; and if it is determined that no memory space has been allocated:
automatically allocating memory space in the storage system for the virtual address; and
completing the operation on the allocated memory space;

wherein the operation is a read operation, and wherein if it determined that no memory space has been allocated, completing the operation includes returning a default formatted page without retrieving any data from the storage system.

16. A method of dynamically mapping addresses between a virtual disk address and one or more physical block addresses for a storage system in response to a request from a host system to perform an operation on the storage system, the method comprising:

receiving a request from a host to perform an operation on one or more blocks of the storage system, said request including a virtual memory address, wherein the operation is a write operation and wherein the request includes one or more blocks of data to be written to the storage system;

determining from a mapping table whether memory space in the storage system has been allocated for the virtual memory address;

if it is determined that memory space has been allocated, completing the operation on the allocated memory space; and if it is determined that no memory space has been allocated:
automatically allocating memory space in the storage system for the virtual address, including determining a number of blocks of memory space in the storage system to be allocated, wherein the number of blocks allocated is greater than the number of data blocks included with the write request; and completing the operation on the allocated memory space.

* * * * *